Nov. 14, 1967  L. E. SCHWARTZ  3,352,027
AUDIO TEACHING DEVICE
Filed Oct. 22, 1965
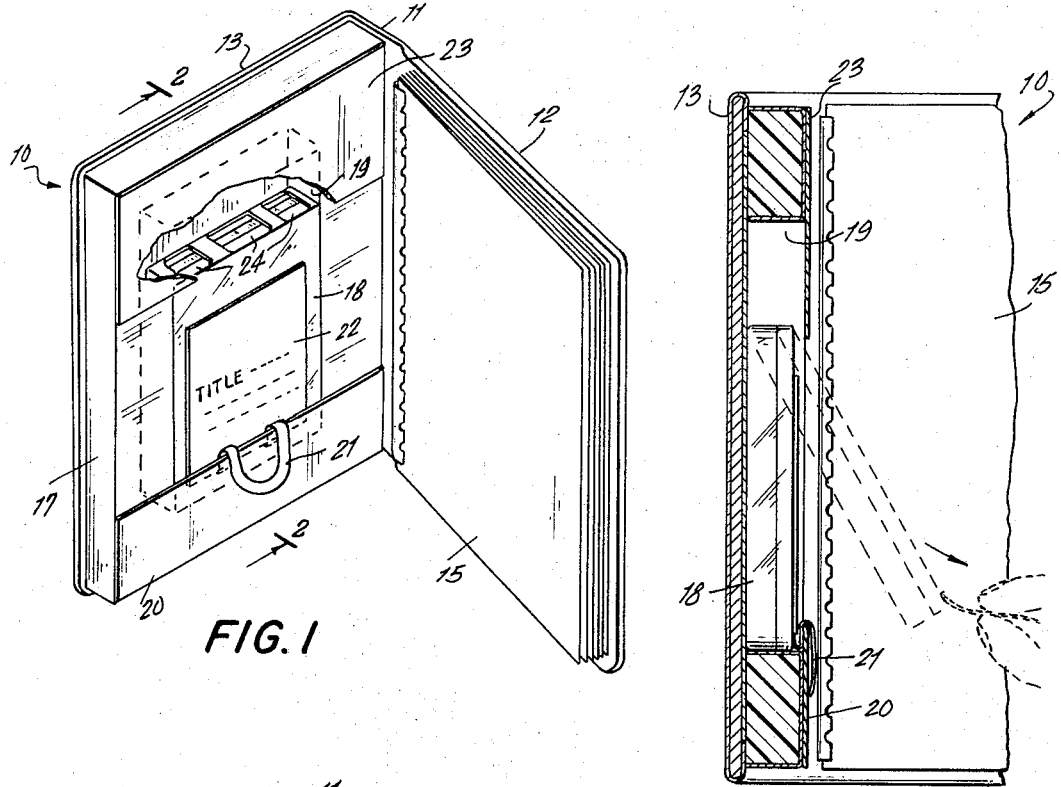
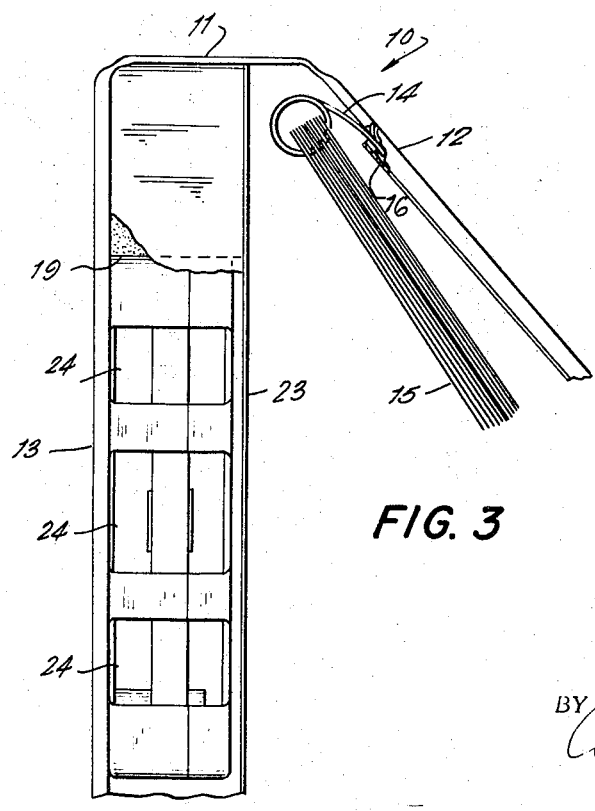
INVENTOR.
LOUIS E. SCHWARTZ
BY
ATTORNEY ns. 3,352,027
AUDIO TEACHING DEVICE
Louis E. Schwartz, New York Law School, 57 Worth St.,
New York, N.Y. 10013
Filed Oct. 22, 1965, Ser. No. 501,583
1 Claim. (Cl. 35—8)

ABSTRACT OF THE DISCLOSURE

An audio teaching device is provided in the form of a book having an instruction book secured to the inside of one cover thereof and a tape cartridge receiving recess in the opposed cover. The tape cartridge is provided with a flexible handle which insures that the cartridge will be withdrawn from the device in proper orientation for insertion in a tape playing machine.

---

This invention relates to a teaching aid and specifically to apparatus useful in teaching by means of tape recordings.

In teaching by means of tape recordings it is extremely useful to have instruction or work books for the student which are keyed to and used in conjunction with the taped lesson. Since the instruction books and tapes are used together it is most convenient from the standpoint of storage, transportation, and handling to provide a single member which will incorporate both elements. However, the instruction book and tape member or cartridge as it is frequently called, are usually handled by a large number of students, some of whom may be careless or unskilled in the use of the tape cartridge.

Accordingly, it is an object of the present invention to provide an audio teaching device in which the instruction book and tape cartridge are carried ready for use.

Another object of the present invention is to provide an audio teaching device which will ensure the proper handling of the tape cartridge as it is inserted and removed from the tape playing machine.

A further object of the present invention is to provide an audio teaching device which will protect the tape cartridge when it is not in use.

Still another object of the present invention is to provide an audio teaching device which will accommodate various work books in an interchangeable manner.

A feature of the present invention is its use of a booklike member having a thick cover, recessed to receive an audio tape cartridge.

Another feature of the present invention is the use of a flexible handle member which will ensure the proper orientation and disposition of the tape cartridge both in and out of the tape playing machine.

A further feature of the present invention is the use of a teaching book member which is slidably received with a second cover portion of the teaching device.

The invention consists of the construction, combination and arrangement of parts, as herein illustrated, described and claimed.

In the accompanying drawing, forming a part hereof, is illustrated one form of embodiment of the invention, and in which:

FIGURE 1 is an isometric view of a complete embodiment of the present invention.

FIGURE 2 is a sectional view taken on line 2—2 in FIGURE 1, looking in the direction of the arrows.

FIGURE 3 is a fragmentary view in side elevation of a portion of the teaching device with certain parts broken away.

Referring to the drawings and particularly to FIGURE 1, 10 indicates an audio teaching device in the nature of a book having a back 11 thereon, and cover members 12, 13. The cover member 13 may be rigidly secured to the back 11 and the cover 12 hingedly secured thereto. The cover member 12 is provided with a pocket 16 (best shown in FIGURE 3) to receive a tab 14, on an instruction book 15. The tab 14 is slipped into the pocket 16 and holds the instruction book 15 to the cover member 12. It will be apparent that instruction books can be slid in and out of the cover member 12 as desired.

The opposite cover member 13 is built up as indicated at 17, to provide a substantial thickness corresponding to the thickness of a tape cartridge 18, which is carried therein. The tape cartridge 18 is disposed within a recess 19 within the thickened portion 17 of the cover member 13. A retaining panel 20 is disposed across the bottom of the recess 19 so as to overlie a portion of the tape cartridge 18 when it is slipped within the recess 19. A second retaining panel 23 is positioned across the top of the recess 19 and also overlies a portion of the cartridge 18. The retaining panels 20, 23, prevent the tape cartridge 18 from falling out of the recess when the teaching device is opened.

As shown in FIGURES 1 and 2, the recess 19 is somewhat longer and deeper than the tape cartridge 18 so that the tape cartridge can be slid in and out of the recess and behind the retaining panels 20, 23. When the covers 12, 13, are brought together, the entire assembly has the appearance of a thick book and may be carried or placed upon the shelf of a library as desired.

In order to use the audio teaching device, the tape cartridge 18 must be inserted into the tape playing machine. The tape cartridge 18 must be properly oriented during this operation or the machine will not function properly. Since the tape cartridge must be handled by a large number of students it is important that the orientation of the tape cartridge be ensured.

In the present device there has been provided a simple yet highly effective method of ensuring that the tape cartridge 18 will be properly used by the student. The tape cartridge 18 is constructed with a small handle member 21, secured to one face thereof as shown in FIGURES 1 and 2. The handle member 21 is preferably made of some flexible material such as a strip of Mylar, neoprene, or the like. However, it is within the purview of the present invention to make the handle member 21 of any material providing it does not interfere with the operation of the tape playing machine. The handle member 21 is secured to the tape cartridge 18 in such a manner that it is disposed on the upper front face of the tape cartridge when the cartridge is in use. As the student removes the tape cartridge from the tape playing machine by grasping the handle, he will automatically place it within the recess 19 of the teaching device with the handle 21 facing outwardly and at the lower end of the tape cartridge in the manner shown in FIGURE 1. The next student will grasp the tape cartridge by the handle 21, in order to remove it from the recess 19, and, without releasing the tape cartridge properly place it in the tape playing machine in its proper orientation. The tape cartridge will not be placed in the machine upsidedown nor will it be mishandled by the student as it is put into and drawn out of the audio teaching device 10. The handle 21 further protects the tape cartridge in that it guards against accidental dropping of the cartridge in its passage from the teaching device 10 into the tape playing machine and back again.

The tape cartridge used for audio instruction is generally in the form of a flat hollow rectangular case within which the magnetic tape is carried. Openings 24 at one end of the case give access to the tape within. Upon insertion into a tape playing machine (not shown) the tape is driven through the play-back head of the amplifier to produce the audible message. The tape cartridge is usually provided with a label 22 to identify the program. In the present embodiment the handle 21 will ensure that the label will face outwardly and be properly oriented when the tape cartridge 18 is placed in the recess 19, thereby preventing confusion on the part of the student.

It will be apparent that the same book cover can receive different tape cartridges and different instruction books as required without departing from the spirit of the invention. It will also be seen that the books can be permanently secured to the cover as by bonding, sewing or the like.

From the foregoing it will be seen that there has been provided an audio teaching device which presents an instruction book and audio tape cartridge in a most useful manner, protects the book and tape cartridge from damage and ensures that the tape cartridge be used properly and without injury to the delicate mechanism of the tape cartirdge and tape playing machine.

The panel 23 overlying the recess 19 further prevents accidental damage to the tape cartridge 18 by students thrusting their fingers into the opening 24.

Having thus fully described the invention, what is claimed as new and desired to be secured by Letters Patent of the United States, is:

An audio-teaching accessory comprising in combination, a first cover member, a second cover member, a rectangular back secured along its opposed long margins to the first and second cover members to form a book-like structure, an instruction book, means to secure the book to the first cover, a recessed portiton in the second cover, a rectangular tape cartridge of greater width than thickness freely received within the recess, a handle member on said tape cartridge of a flexible, ribbon-like material disposed toward the first cover member when the tape cartridge is within the second cover member and tape cartridge retaining panels overlying a portion of the recess.

References Cited
UNITED STATES PATENTS

| | | | |
|---|---|---|---|
| 1,490,295 | 4/1924 | Stephens | 35—35 |
| 2,524,143 | 10/1950 | Smith | 35—35 |
| 2,600,471 | 6/1950 | Briere | 274—11 X |
| 2,649,799 | 8/1953 | Spertus | 40—152 |
| 2,701,718 | 2/1955 | Allen et al. | 274—11 X |
| 3,273,894 | 9/1966 | Clawson | 35—81 X |
| 3,285,613 | 11/1966 | Hallamore | 274—11 |

EUGENE R. CAPOZIO, *Primary Examiner.*

R. W. WEIG, *Assistant Examiner.*